United States Patent
Nagura et al.

(10) Patent No.: US 9,435,488 B2
(45) Date of Patent: Sep. 6, 2016

(54) HYDROGEN STATION

(75) Inventors: Kenji Nagura, Takasago (JP); Hitoshi Takagi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 341 days.

(21) Appl. No.: 14/111,681

(22) PCT Filed: Apr. 24, 2012

(86) PCT No.: PCT/JP2012/002817
§ 371 (c)(1),
(2), (4) Date: Jan. 13, 2014

(87) PCT Pub. No.: WO2012/147340
PCT Pub. Date: Nov. 1, 2012

(65) Prior Publication Data
US 2014/0196814 A1     Jul. 17, 2014

(30) Foreign Application Priority Data

Apr. 26, 2011 (JP) ................. 2011-098636
Jun. 27, 2011 (JP) ................. 2011-141900
Jun. 30, 2011 (JP) ................. 2011-146276

(51) Int. Cl.
*B65B 1/30*     (2006.01)
*F17C 5/06*     (2006.01)
(Continued)

(52) U.S. Cl.
CPC ................ *F17C 5/06* (2013.01); *F17C 5/007* (2013.01); *F17C 13/026* (2013.01);
(Continued)

(58) Field of Classification Search
CPC ........ F17C 5/007; F17C 5/06; F17C 13/025;
F17C 13/026; F17C 2227/0164; F17C 2227/0185; F17C 2227/0337; F17C 2227/0388; F17C 2260/023; F17C 2260/012
USPC ............ 141/4, 39, 94, 95, 82, 302; 222/318, 222/424

See application file for complete search history.

(56) References Cited

U.S. PATENT DOCUMENTS 6,360,793 B1 * 3/2002 Sugano ................... F17C 5/007
141/18
2002/0014277 A1 2/2002 Togasawa et al.
(Continued)

FOREIGN PATENT DOCUMENTS

CN     1266966 A     9/2000
CN     101970291 A     2/2011
(Continued)

OTHER PUBLICATIONS

Extended European Search Report issued Sep. 16, 2015 in Patent Application No. 12777336.4.
(Continued)

*Primary Examiner* — Jason K Niesz
(74) *Attorney, Agent, or Firm* — Oblon, McClelland, Maier & Neustadt, L.L.P.

(57) ABSTRACT

Provided is a hydrogen station that supplies hydrogen to an external hydrogen tank, the hydrogen station including: a reciprocating compressor that is driven by a driver of which revolution is controllable; a cooling device that is capable of cooling hydrogen supplied from the reciprocating compressor to the hydrogen tank; a temperature sensor that detects an internal temperature of the hydrogen tank or a temperature of the hydrogen supplied to the hydrogen tank; and a control unit that controls the revolution of the driver based on the temperature detected by the temperature sensor.

7 Claims, 6 Drawing Sheets

(51) Int. Cl.
  *F17C 5/00* (2006.01)
  *F17C 13/02* (2006.01)
(52) U.S. Cl.
  CPC ........... *F17C 2205/0326* (2013.01); *F17C 2205/0338* (2013.01); *F17C 2221/012* (2013.01); *F17C 2223/0123* (2013.01); *F17C 2223/033* (2013.01); *F17C 2225/0123* (2013.01); *F17C 2225/036* (2013.01); *F17C 2227/0164* (2013.01); *F17C 2227/0185* (2013.01); *F17C 2227/0337* (2013.01); *F17C 2227/0388* (2013.01); *F17C 2250/01* (2013.01); *F17C 2250/032* (2013.01); *F17C 2250/043* (2013.01); *F17C 2250/0439* (2013.01); *F17C 2250/0443* (2013.01); *F17C 2260/023* (2013.01); *F17C 2265/065* (2013.01); *F17C 2270/0139* (2013.01); *Y02E 60/321* (2013.01)

(56) References Cited

U.S. PATENT DOCUMENTS

2004/0182470 A1  9/2004  White
2011/0103976 A1  5/2011  Fejzuli
2012/0125480 A1*  5/2012  Inagi ................ F17C 5/06 141/4
2014/0369858 A1  12/2014  Fejzuli

FOREIGN PATENT DOCUMENTS

| | | |
|---|---|---|
| JP | 2000 230700 | 8/2000 |
| JP | 2001 355795 | 12/2001 |
| JP | 2006 002896 | 1/2006 |
| JP | 2006 144730 | 6/2006 |
| JP | 2011 099468 | 5/2011 |
| KR | 10-2010-0139013 | 12/2010 |
| WO | WO 2009/112479 A1 | 9/2009 |
| WO | 2011 012939 | 2/2011 |

OTHER PUBLICATIONS

International Search Report Issued Jul. 31, 2012 in PCT/JP12/002817 Filed Apr. 24, 2012.
Written Opinion of the International Searing Authority Issued Jul. 31, 2012 in PCT/JP12/002817 Filed Apr. 24, 2012.

* cited by examiner

HYDROGEN STATION

TECHNICAL FIELD

The present invention relates to a hydrogen station that supplies hydrogen to a fuel cell vehicle, a hydrogen vehicle, and the like.

BACKGROUND ART

In recent years, there have been concerns such as global warming and aerial pollution caused by carbon dioxide ($CO_2$), nitrogen oxide (NOX), and suspended particulate matter (PM). For this reason, instead of an existing gasoline internal-combustion engine vehicle, a fuel cell vehicle (FCV) which is driven by using electric energy based on an oxidization reaction between hydrogen and oxygen in a fuel cell mounted on the vehicle has been gaining attention.

The fuel cell vehicle does not discharge any toxic matter in addition to the above-described carbon dioxide and the like. Further, the fuel cell vehicle has energy efficiency better than that of the gasoline internal-combustion engine vehicle. Likewise, the fuel cell vehicle has various advantages that may not be obtained from the gasoline internal-combustion engine vehicle.

Incidentally, the fuel cell vehicle may be largely classified into a type in which hydrogen is charged from a hydrogen station to the vehicle and a type in which a fuel other than hydrogen is charged to the vehicle and hydrogen is produced in a vehicle installed reforming unit. However, the former type has more advantages from the effect of a reduction of carbon dioxide ($CO_2$). Accordingly, there is a need to more actively study and develop the fuel cell vehicle and the hydrogen station that charge hydrogen to the fuel cell vehicle.

In a case of the fuel cell vehicle of the type in which hydrogen (hydrogen gas) is charged from the hydrogen station to the vehicle, compressed hydrogen is charged to a hydrogen tank mounted on the vehicle.

Incidentally, in a case where a gas is expanded while a difference in pressure thereof is maintained when a high-pressure gas of a supply source is transferred (that is, expanded) to a low-pressure state of a supply target, a change in temperature occurs in the gas due to the Joule-Thompson effect.

A change in temperature caused by the Joule-Thompson effect depends on the initial temperature of the gas. When the initial temperature is equal to or lower than the inversion temperature, the temperature of the gas decreases. Then, when the initial temperature is higher than the inversion temperature, the temperature of the gas increases. Here, the inversion temperature of the hydrogen is about 215 K (−58.15° C.). Since this inversion temperature is fairly lower than those of the other gases, when the hydrogen is generally charged to the hydrogen tank of the fuel cell vehicle or the like, an abrupt increase in temperature occurs in the charged hydrogen.

Accordingly, in the hydrogen station, there is a need to suppress an increase in the internal temperature of the hydrogen tank caused by an abrupt increase in temperature of the hydrogen when the hydrogen is charged to the hydrogen tank. Thus, various proposals have been suggested. For example, Patent Document 1 discloses a method of quickly charging hydrogen to a hydrogen tank (and a hydrogen station realizing the quick hydrogen charging method) including the steps of connecting a hydrogen supply source to a hydrogen tank and increasing a hydrogen charging speed in response to a pressure inside the hydrogen tank by a charging speed changing unit provided in the course of a passage connecting the hydrogen supply source to the hydrogen tank.

As described above, in the hydrogen station, there is a need to suppress an increase in the internal temperature of the hydrogen tank caused by an abrupt increase in temperature of the hydrogen when the hydrogen is charged to the hydrogen tank. For this reason, various proposals have been suggested, but more proposals have been demanded from the viewpoint of enrichment of technologies.

Incidentally, the hydrogen station generally includes a compressor which compresses the hydrogen to be supplied to the fuel cell vehicle or the like.

In order to charge a large amount of hydrogen to the hydrogen tank of the supply target, the compressor needs to have an ability of increasing the pressure of the hydrogen to a very high pressure of 100 MPa. For this reason, as the compressor dedicated for the hydrogen station, adoption of a so-called reciprocating compressor has been examined. Furthermore, as the reciprocating compressor, a diaphragm type compressor, a piston type compressor, a plunger type compressor, an ionic compressor, and the like are known.

In the reciprocating compressor, a "suction valve unloading method" and a "clearance pocket method" are adopted in many cases as a means for adjusting the amount of a fluid to be supplied. The suction valve unloading method is a method of adjusting a flow rate of a gas in a manner such that a suction valve plate of a cylinder is pushed to be opened and an initially suctioned gas is made to reversely flow to a suction side so as not to undergo a compressing process. Meanwhile, the clearance pocket method is a method of adjusting a flow rate of a gas in a manner such that a clearance pocket attached to a cylinder head or the like is opened and closed so as to change a size of a gap (clearance).

However, since the flow rate is gradually adjusted in any method of the "suction valve unloading method" and the "clearance pocket method", it is difficult to perform a uniform temperature control in the hydrogen station.

Furthermore, as the "suction valve unloading method", a method is proposed which continuously adjusts the capacity in the range of about 20 to 100% by combining a hydraulic control with a suction valve unloading mechanism, but this method is not practical in that a facility greatly increases in size.

CITATION LIST

Patent Document

Patent Document 1: JP 2001-355795 A

SUMMARY OF THE INVENTION

An object of the present invention is to provide a hydrogen station including a reciprocating compressor and capable of easily controlling a temperature of hydrogen supplied thereto and suppressing an increase in an internal temperature of a hydrogen tank when hydrogen is charged to the hydrogen tank.

According to an aspect of the present invention, there is provided a hydrogen station that supplies hydrogen to an external hydrogen tank, the hydrogen station including: a reciprocating compressor that is driven by a driver of which revolution is controllable; a cooling device that is capable of cooling hydrogen supplied from the reciprocating compressor to the hydrogen tank; a temperature sensor that detects an internal temperature of the hydrogen tank or a temperature of the hydrogen supplied to the hydrogen tank; and a control unit that controls the revolution of the driver based on the temperature detected by the temperature sensor.

Further, according to a further aspect of the present invention, there is provided a hydrogen station that supplies hydrogen to an external hydrogen tank, the hydrogen station including: a reciprocating compressor that is driven by a driver; a cooling device that is capable of cooling the hydrogen supplied from the reciprocating compressor to the hydrogen tank; a return passage that includes an adjustment valve and causes an upstream side of the cooling device to communicate with a suction side of the reciprocating compressor at a discharge side of the reciprocating compressor; a temperature sensor that detects an internal temperature of the hydrogen tank or a temperature of the hydrogen supplied to the hydrogen tank; and a control unit that adjusts an opening degree of the adjustment valve based on the temperature detected by the temperature sensor.

Further, according to a still further aspect of the present invention, there is provided a hydrogen station that supplies hydrogen to an external hydrogen tank, the hydrogen station including: a first reciprocating compressor that is driven by a driver of which revolution is controllable; an intermediate passage through which the hydrogen compressed by the first reciprocating compressor flows; a second reciprocating compressor that is connected to the first reciprocating compressor through the intermediate passage; a cooling device that is capable of cooling the hydrogen supplied from the second reciprocating compressor to the hydrogen tank; a pressure sensor that detects an internal pressure of the intermediate passage; and a control unit that controls the revolution of the driver driving the first reciprocating compressor based on the pressure detected by the pressure sensor.

DESCRIPTION OF EMBODIMENTS

Figure 1:
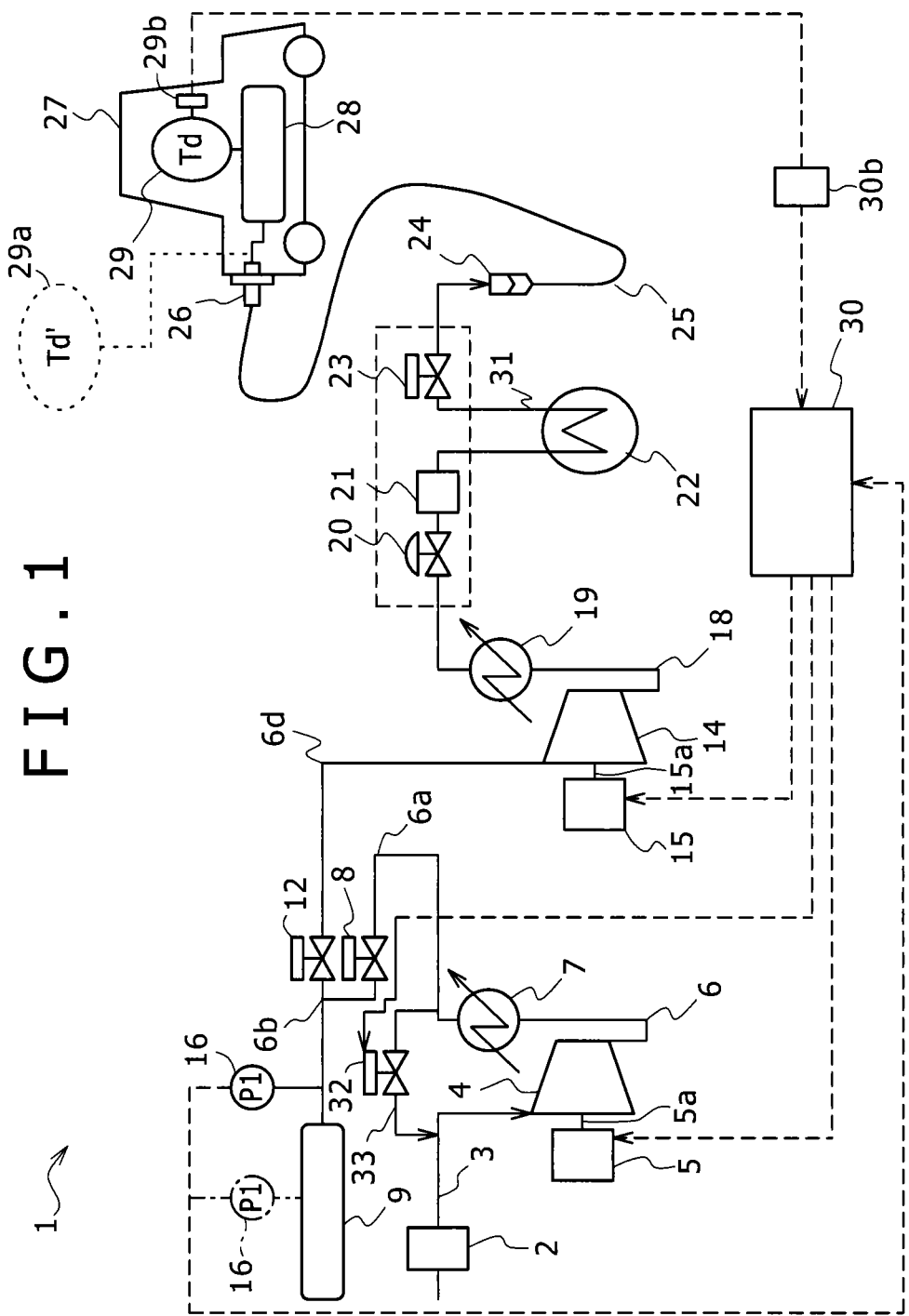
FIG. 1 is a diagram schematically illustrating a configuration of a hydrogen station according to a first embodiment of the present invention.

Hereinafter, embodiments of the present invention will be described in detail by referring to the drawings.

First Embodiment

FIG. 1 illustrates a configuration of a hydrogen station 1 according to a first embodiment of the present invention. The hydrogen station 1 has a configuration in which hydrogen (a hydrogen gas) is first supplied from a hydrogen supply source (not shown) to a low-pressure-stage reciprocating compressor (a low-pressure-side reciprocating compressor: a first compressor) 4 through a supply passage 3 equipped with a filter 2.

A driver 5 (a motor or the like) is connected to the low-pressure-side reciprocating compressor 4 through a drive shaft 5a. The low-pressure-side reciprocating compressor 4 is driven by the rotation of the drive shaft 5a of the driver 5. The driver 5 is a motor which is driven by an inverter. The revolution of the driver 5 is controllable. That is, the drive shaft 5a may be rotated at an arbitrary revolution. Furthermore, the driver 5 may be any machine of which the revolution is controllable, and is not limited to the motor which is driven by the inverter.

The hydrogen which is compressed by the low-pressure-side reciprocating compressor 4 is discharged to an intermediate passage 6. The discharge side pressure of the low-pressure-side reciprocating compressor 4 at this time is controlled at, for example, 40 MPa. The intermediate passage 6 is equipped with a cooler 7 that cools the hydrogen which increases in temperature by the compression through the low-pressure-side reciprocating compressor 4. Then, the intermediate passage 6 is connected to an intermediate pressure accumulator 9 through an opening and closing valve 8 and a branch point 6b.

Further, the intermediate passage 6 connects the intermediate pressure accumulator 9 and a high-pressure-stage reciprocating compressor (a high-pressure-side reciprocating compressor: a second compressor) 14 to each other through the branch point 6b and an opening and closing valve 12. That is, the intermediate passage 6 which extends from the intermediate pressure accumulator 9 is branched at the halfway position (the branch point 6b), one branched passage is connected to the discharge side of the low-pressure-side reciprocating compressor 4, and the other branched passage is connected to the suction side of the high-pressure-side reciprocating compressor 14.

A driver 15 is connected to the high-pressure-side reciprocating compressor 14 through a drive shaft 15a. The high-pressure-side reciprocating compressor 14 is driven by the rotation of the drive shaft 15a of the driver 15. The driver 15 is a motor which is driven by an inverter. The revolution of the driver 15 is controllable. That is, the drive shaft 15a may be rotated at an arbitrary revolution. Furthermore, the driver 15 may be any machine of which the revolution is controllable, and is not limited to the motor which is driven by the inverter.

The intermediate pressure accumulator 9 may temporarily accumulate the hydrogen which is supplied (discharged) from the low-pressure-side reciprocating compressor 4.

A pressure sensor 16 which detects a pressure P1 inside the intermediate pressure accumulator 9 is provided between the branch point 6b and the intermediate pressure accumulator 9 in the intermediate passage 6. Furthermore, the pressure sensor 16 may be provided in the intermediate pressure accumulator 9 so as to detect the pressure P1 inside the intermediate pressure accumulator 9. Since the inside of the portion between the branch point 6b and the intermediate pressure accumulator 9 in the intermediate passage 6 communicates with the inside of the intermediate pressure accumulator 9, both portions have the same pressure.

The opening and closing valve 8 is opened when the detection pressure P1 detected by the pressure sensor 16 is lower than a predetermined first threshold value. Further, the opening and closing valve 8 is closed when the detection pressure P1 detected by the pressure sensor 16 is equal to or higher than the first threshold value. The opening and closing operation (particularly, the closing operation) of the opening and closing valve 8 prevents a state where the amount of the hydrogen supplied from the low-pressure-side reciprocating compressor 4 excessively increases so that the internal pressure of the intermediate pressure accumulator 9 increases too much.

The opening and closing valve 12 is closed when the detection pressure P1 detected by the pressure sensor 16 is lower than a predetermined second threshold value. Further, the opening and closing valve 12 is opened when the detection pressure P1 detected by the pressure sensor 16 is equal to or higher than the second threshold value. The opening and closing operation of the opening and closing valve 12 prevents a state where the pressure of the hydrogen supplied to the high-pressure-side reciprocating compressor 14 excessively decreases.

The first threshold value and the second threshold value which are used in the opening and closing control of the opening and closing valve 8 and the opening and closing valve 12 are set as below.

The first threshold value is set based on the upper limit of the allowable range of the internal pressure of the intermediate pressure accumulator 9. That is, the first threshold value is a value that has an increasing possibility in which the intermediate pressure accumulator 9 is damaged by the internal pressure of the intermediate passage 6 connected to the intermediate pressure accumulator 9 when the pressure exceeds the first threshold value. Further, the second threshold value is set based on the lower limit value of the allowable range of the suction pressure when the high-pressure-side reciprocating compressor 14 is driven. That is, the second threshold value is a value in which the high-pressure-side reciprocating compressor 14 may not be normally operated (a fluid is not normally compressed) when the internal pressure of the intermediate passage 6 connected to the high-pressure-side reciprocating compressor 14 becomes lower than the second threshold value.

Furthermore, the control of the revolution the low-pressure-side reciprocating compressor 4 to be described later is performed based on the detection pressure P1 detected by the pressure sensor 16 by setting an upper-limit threshold pressure PH and a lower-limit threshold pressure PL of a predetermined pressure range. The control subjects of both controls (the opening and closing control of the opening and closing valve 8 and the opening and closing valve 12 based on the detection pressure P1 and the control of the revolution the low-pressure-side reciprocating compressor 4 based on the detection pressure P1) are different from each other. Further, the pressure of the upper-limit threshold value (the first threshold value) in the opening and closing valve control is a value which is sufficiently larger than the upper-limit threshold pressure PH in the revolution control, and the pressure of the lower-limit threshold value (the second threshold value) in the opening and closing valve control is a value which is sufficiently smaller than the lower-limit threshold pressure PL in the revolution control. For this reason, even when both controls are performed in parallel, any problem in control such as an interference therebetween does not occur.

Further, as will be described later, in the hydrogen station 1, the revolution of the driver 5 that drives the low-pressure-side reciprocating compressor 4 is controllable based on the pressure (or the pressure P1 inside the intermediate pressure accumulator 9) of the intermediate passage 6. That is, the opening and closing control of the opening and closing valve 8 and the opening and closing valve 12 may not be performed. In this case, in the hydrogen station 1, the opening and closing valve 8 and the opening and closing valve 12 may not be provided.

The hydrogen which is compressed by the high-pressure-side reciprocating compressor 14 is discharged to a discharge passage 18. The discharge side pressure of the high-pressure-side reciprocating compressor 14 at this time is controlled at, for example, 100 MPa. The discharge passage 18 is equipped with a cooler 19 that cools the hydrogen which increases in temperature by the compression through the high-pressure-side reciprocating compressor 14.

The portion after the cooler 19 in the discharge passage 18 is equipped with a flow rate adjustment valve 20, a flowmeter 21, and a cooler 22 which are provided in this order. The opening degree of the flow rate adjustment valve 20 is controlled based on the flow rate value which is detected by the flowmeter 21 at the downstream side of the flow rate adjustment valve 20. Accordingly, the flow rate of the hydrogen passing through the flow rate adjustment valve 20 is adjusted. The cooler 22 that is disposed at the end of the discharge passage 18 further cools the hydrogen which is cooled by the cooler 19 at the upstream side of the cooler 22. For example, the cooler 19 cools the high-temperature hydrogen of about 130° C. to about 40° C., and the cooler 22 cools the hydrogen of about 40° C. cooled by the cooler 19 to about −40° C.

In this way, the hydrogen of which the temperature is finally adjusted by the cooling of the cooler 22 is supplied and charged to an on-vehicle hydrogen tank 28 of a fuel cell vehicle 27 by a hydrogen charging passage 31. The hydrogen charging passage 31 connects the outlet side of the cooler 22 to a charging nozzle 26. Furthermore, an interruption valve 23 is disposed at a position immediately after the outlet side of the cooler 22 in the hydrogen charging passage 31. The interruption valve 23 constitutes a dispenser (a charging machine) along with the flowmeter 21 and the flow rate adjustment valve 20 provided in the discharge passage 18.

Then, an emergency separation coupler 24 is provided at a halfway position of the hydrogen charging passage 31. The emergency separation coupler 24 is separated (specifically, the intermediate portion is separated) when a charging hose 25 extending toward the fuel cell vehicle 27 through the emergency separation coupler is pulled by an extremely strong force. In this case, the high-pressure hydrogen is not discharged from both the portion near the hydrogen supply target (the fuel cell vehicle 27) of the separated emergency separation coupler 24 and the portion near the hydrogen supply source of the separated emergency separation coupler 24. Furthermore, the charging hose 25 constitutes a part of the hydrogen charging passage 31 (that is, the charging hose 25 is included in the hydrogen charging passage 31).

The charging nozzle 26 is provided in the most downstream end of the charging hose 25 extending from the emergency separation coupler 24. The charging nozzle 26 may be connected to a nozzle port (not shown) of the fuel cell vehicle 27. Then, the hydrogen supplied from hydrogen station 1 is supplied and charged to the on-vehicle hydrogen tank 28 installed inside the fuel cell vehicle 27.

The on-vehicle hydrogen tank 28 is equipped with a temperature sensor 29 capable of detecting an internal temperature Td. Furthermore, it is desirable that the temperature sensor 29 be installed at a container constituting the on-vehicle hydrogen tank 28 in order to accurately detect the internal temperature Td of the on-vehicle hydrogen tank 28, but the invention is not limited thereto. For example, when a temperature Td' detected by the temperature sensor is approximately equal to the temperature Td or the internal temperature Td of the on-vehicle hydrogen tank 28 may be derived from the temperature Td', the temperature sensor is employed as the temperature sensor 29 capable of directly or indirectly detecting the temperature Td. Specifically, a temperature sensor 29a shown in FIG. 1 may be provided in the passage which connects the nozzle port (not shown) of the fuel cell vehicle 27 to the on-vehicle hydrogen tank 28.

The temperature sensor 29 (or 29a) is connected to a transmitter 29b installed in the fuel cell vehicle. The transmitter 29b transmits a signal (temperature data) according to the internal temperature Td (or Td') of the on-vehicle hydrogen tank 28 detected by the temperature sensor 29 (or 29a) to the hydrogen station 1 in a wired or wireless manner. Meanwhile, the hydrogen station 1 is equipped with a receiver 30b capable of receiving the temperature data. The temperature data which is received by the receiver 30b is output to a controller 30.

Further, the temperature sensor 29 capable of detecting the internal temperature Td of the hydrogen charging passage 31 may be provided at an arbitrary position of the hydrogen charging passage 31 connecting the outlet side of the cooler 22 to the charging nozzle 26. In the specific example shown in FIG. 2, the temperature sensor 29 is provided at the position of the outlet side of the interruption valve 23 in the hydrogen charging passage 31. In this case, the temperature Td inside the hydrogen charging passage 31 is precisely different from the internal temperature Td of the on-vehicle hydrogen tank 28 (specifically, the temperature Td inside the hydrogen charging passage 31 is lower than the internal temperature of the on-vehicle hydrogen tank 28). However, since the temperature Td inside the hydrogen charging passage 31 is correlated with the internal temperature Td of the on-vehicle hydrogen tank 28, it is possible to estimate the internal temperature of the on-vehicle hydrogen tank 28 from the internal temperature of the hydrogen charging passage 31 with comparatively high precision. That is, the temperature Td inside the hydrogen charging passage 31 is different from the internal temperature Td of the on-vehicle hydrogen tank 28, but both temperatures may be substantially handled in the same way due to the correlation therebetween. For this reason, in the description below, the phrase of the "internal temperature Td of the on-vehicle hydrogen tank 28" may be mentioned as the "internal temperature Td of the hydrogen charging passage 31". Further, as in this example, when the temperature sensor 29 is integrally assembled to the passage as a part of the dispenser in the pipe passage of the hydrogen station 1a, the individual temperature sensor 29 (or 29a) may not be installed in the fuel cell vehicle 27, and the temperature data does not need to be transmitted from the fuel cell vehicle 27 to the hydrogen station in a wireless (or wired) manner. For this reason, there is no need to provide the transmitter 29b which is provided in the fuel cell vehicle so as to transmit the temperature data, and there is no need to provide the receiver 30b which is provided in the hydrogen station so as to receive the temperature data. When the transmitter 29b and the receiver 30b are not provided, there is an advantage that the communication malfunction of the temperature data is not caused by the disturbance between the transmitter 29b and the receiver 30b (or the inside of the transmitter 29b and the inside of the receiver 30b). Further, there is an advantage that the cost may be reduced when the transmitter 29b and the receiver 30b are not provided.

Incidentally, in FIG. 1 (or FIG. 2), a signal in response to the detection pressure P1 detected by the pressure sensor 16 (a signal output from the pressure sensor 16) and a signal in response to the temperature Td detected by the temperature sensor 29 (a signal output from the temperature sensor 29 in response to the temperature detected by the temperature sensor 29) are input to the controller (the control unit) 30 provided in the hydrogen station 1. The controller 30 controls the flow rate of the hydrogen discharged from the low-pressure-side reciprocating compressor 4 by controlling the revolution of the driver 5 based on the detection pressure P1 detected by the pressure sensor 16. That is, the controller 30 controls the capacity of the low-pressure-side reciprocating compressor 4 based on the detection pressure P1 detected by the pressure sensor 16. Further, the controller 30 controls the flow rate of the hydrogen discharged from the high-pressure-side reciprocating compressor 14 by controlling the revolution of the driver 15 based on the signal according to the temperature Td. That is, the controller 30 controls the capacity of the high-pressure-side reciprocating compressor 14 based on the signal according to the temperature Td.

Furthermore, a bypass passage 33 is connected to the supply passage 3 at the upstream side of the low-pressure-side reciprocating compressor 4 and the intermediate passage 6 at the downstream side of the low-pressure-side reciprocating compressor 4. That is, the bypass passage 33 causes the suction side of the low-pressure-side reciprocating compressor 4 to communicate with the upstream portion of the intermediate pressure accumulator 9 in the intermediate passage 6. The bypass passage 33 includes a bypass flow rate adjustment valve (an adjustment valve) 32. As will be described later, the bypass flow rate adjustment valve 32 is opened when the revolution of the driver 5 decreases and reaches a lower limit value Rmin. In this way, when the bypass flow rate adjustment valve 32 is opened, the supply passage 3 at the upstream side of the low-pressure-side reciprocating compressor 4 communicates with the intermediate passage 6 at the downstream side of the low-pressure-side reciprocating compressor 4 through the bypass passage 33.

Subsequently, the control of the hydrogen station 1 will be described.

As described above, the hydrogen which is cooled by the cooler 19 is further cooled by the cooler 22 provided at the downstream side of the cooler 19 (for example, the hydrogen is further cooled to −40° C.).

Here, when the low-temperature (high-pressure) hydrogen is supplied to the on-vehicle hydrogen tank 28, a change in temperature occurs due to the above-described Joule-Thompson effect, so that the temperature normally increases.

Meanwhile, in the on-vehicle hydrogen tank 28 generally including a liner formed of metal or resin and a fiber reinforced resin layer stacked on the outer peripheral surface of the liner, an allowed upper-limit temperature Tth is determined in advance in consideration of the specification or the technique. The upper-limit temperature Tth is, for example, 85° C. according to the technical criterion (JARI S 001) of a container for a compressed hydrogen vehicle fuel device. Accordingly, even when the internal temperature of the on-vehicle hydrogen tank 28 increases when the hydrogen is supplied to the on-vehicle hydrogen tank 28, the temperature Td is managed so that the internal temperature Td of the on-vehicle hydrogen tank 28 does not exceed a reference temperature (Tb), set based on the upper-limit temperature Tth, as much as possible. Alternatively, even when the internal temperature Td of the on-vehicle hydrogen tank 28 exceeds the reference temperature (Tb) in some cases, the temperature Td is managed so that the temperature does not exceed the upper-limit temperature Tth and the time in which the temperature exceeds the reference temperature (Tb) becomes shortest.

Furthermore, in this embodiment, the reference temperature (Tb) is an upper limit value Tth-Δt (Δt is, for example, 20° C.) lower than the upper-limit temperature Tth (that is, the temperature has an allowance with respect to the upper-limit temperature Tth). Further, the reference temperature (Tb) may be set as an arbitrary temperature range (Tb1 to Tb2) lower than the upper-limit temperature Tth.

Then, when the internal temperature Td of the on-vehicle hydrogen tank 28 exceeds the reference temperature (Tb), the revolution of the driver 15 of the high-pressure-side reciprocating compressor 14 decreases. Accordingly, the flow rate of the hydrogen discharged from the high-pressure-side reciprocating compressor 14 decreases, and the hydrogen cooling efficiency using the coolers 19 and 22 provided at the downstream side of the high-pressure-side reciprocating compressor 14 relatively increases. As a result, the amount of the hydrogen supplied to the on-vehicle hydrogen tank 28 decreases, and the temperature of the supplied hydrogen decreases, so that the internal temperature Td of the on-vehicle hydrogen tank 28 decreases to the reference temperature (Tb).

Furthermore, when the flow rate of the hydrogen supplied to the on-vehicle hydrogen tank 28 decreases as described above, it is possible to suppress an increase in the internal temperature of the on-vehicle hydrogen tank 28 by the Joule-Thompson effect when the supplied hydrogen expands inside the on-vehicle hydrogen tank 28. For this reason, the internal temperature of the on-vehicle hydrogen tank 28 is effectively decreased by the temperature increase suppressing effect and the relative cooling effect of the coolers 19 and 22.

Further, when the internal temperature Td of the on-vehicle hydrogen tank 28 is lower than the reference temperature (Tb), the flow rate of the hydrogen discharged from the high-pressure-side reciprocating compressor 14 increases with an increase in the revolution of the driver 15 of the high-pressure-side reciprocating compressor 14, and hence the hydrogen cooling efficiency using the coolers 19 and 22 provided at the downstream side of the high-pressure-side reciprocating compressor 14 relatively decreases. Accordingly, the amount of the hydrogen supplied to the on-vehicle hydrogen tank 28 increases, and the temperature of the supplied hydrogen increases, so that the internal temperature Td of the on-vehicle hydrogen tank 28 increases to the reference temperature (Tb). In this way, since the internal temperature Td of the on-vehicle hydrogen tank 28 is maintained at the reference temperature (Tb) equal to or lower than the upper-limit temperature Tth which is allowed in the use of the on-vehicle hydrogen tank 28, degradation or damage under the high temperature of the on-vehicle hydrogen tank 28 is suppressed, and hence the hydrogen is safely and efficiently charged and charged to the on-vehicle hydrogen tank 28.

In this way, in the hydrogen station 1, the controller 30 controls the flow rate of the hydrogen discharged from the high-pressure-side reciprocating compressor 14 (that is, the capacity of the high-pressure-side reciprocating compressor 14) by controlling the revolution of the driver 15 based on the signal according to the temperature Td.

The controller 30 includes a storage unit (not shown). The storage unit of the controller 30 stores (memorizes), for example, a relational expression or correlation data of the internal temperature Td of the on-vehicle hydrogen tank 28 and the revolution of the driver 15R. Regarding the relational expression or the correlation data shown in FIG. 3 (a solid line A or a dashed line B of FIG. 3), when the temperature Td becomes a low value, the corresponding revolution R becomes a high value. On the contrary, when the temperature Td becomes a high value, the corresponding revolution R becomes a low value.

Then, the controller 30 determines the revolution of the driver 15R based on the function expression or the correlation data stored in the storage unit and the temperature Td detected by the temperature sensor 29, and controls the driver 15 so that the revolution becomes the revolution R. Accordingly, the capacity of the high-pressure-side reciprocating compressor 14 is controlled. That is, the controller 30 decreases the revolution of the driver 15R with an increase in the temperature Td, and increases the revolution of the driver 15R with a decrease in the temperature Td.

As a result, when the temperature Td is lower than the reference temperature Tb, the hydrogen supplied to the on-vehicle hydrogen tank 28 is sufficiently cooled. For this reason, the high-pressure-side reciprocating compressor 14 is driven with a comparatively large capacity by increasing the revolution of the driver 15R. Meanwhile, when the temperature Td is higher than the reference temperature Tb, the hydrogen supplied to the on-vehicle hydrogen tank 28 is not sufficiently performed. For this reason, the high-pressure-side reciprocating compressor 14 is driven with a comparatively small capacity by decreasing the revolution of the driver 15R.

As described above, it is possible to provide the hydrogen station 1 capable of performing a continuous capacity control easily managing a pressure and a temperature using the high-pressure-side reciprocating compressor 14 driven by the driver of which the revolution is controllable. That is, since the continuous capacity control may be performed by using the high-pressure-side reciprocating compressor 14 driven by the driver 15 of which the revolution is controllable, it is possible to provide the hydrogen station 1 which includes the compressor and may easily control the pressure and the temperature of the supplied hydrogen. For this reason, according to the hydrogen station 1, as in the existing hydrogen station disclosed in, for example, JP 2009-155190 A, the pressure of the supplied hydrogen may be easily controlled even when the boosting pump that outputs the raised pressure of the hydrogen is not provided.

Further, according to the hydrogen station 1, since the continuous capacity control may be performed, the temperature of the hydrogen may be promptly controlled. Accordingly, according to the hydrogen station 1, even when the temperature of the hydrogen increases when the hydrogen is charged to the on-vehicle hydrogen tank 28, an increase in the internal temperature of the on-vehicle hydrogen tank 28 may be suppressed by promptly decreasing the temperature of the supplied hydrogen (the hydrogen of which the temperature does not increase yet).

Figure 3:
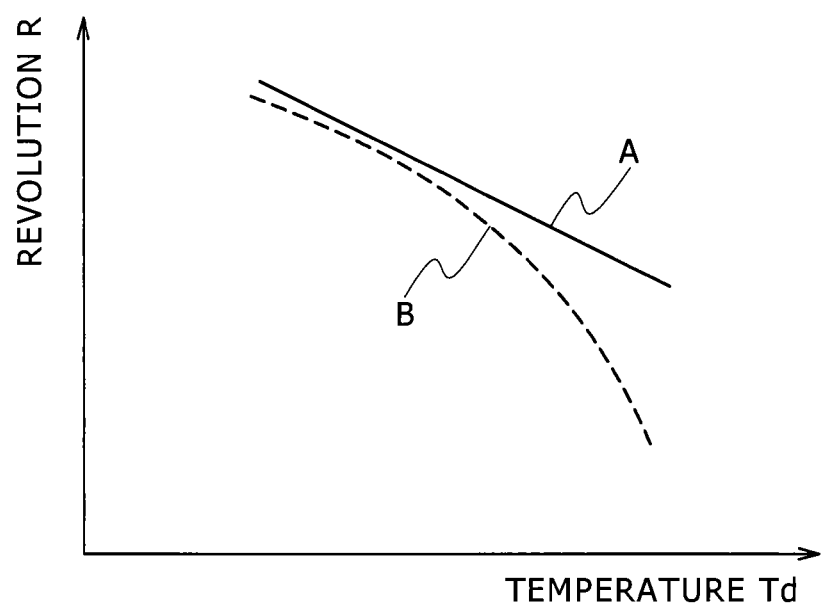
FIG. 3 is a diagram illustrating a relation between an internal temperature of an on-vehicle hydrogen tank and a revolution of a driver of a high-pressure-side reciprocating compressor in the control of the hydrogen station.

In FIG. 3, the solid line A indicates a relation in which the revolution R decreases at a constant ratio with an increase in the temperature Td, that is, a ratio of the decrease amount of the revolution R with respect to the increase amount of the temperature Td does not change when the temperature Td increases. Further, in FIG. 3, the dashed line B indicates a relation in which the decrease degree of the revolution R increases with an increase in the temperature Td, that is, a relation in which a ratio of the decrease amount of the revolution R with respect to the increase amount of the temperature Td increases when the temperature Td increases.

When a control is performed based on the solid line A, the revolution of the driver 15 changes at a constant ratio in response to a change (an increase or a decrease) in the temperature Td (that is, the revolution is not abruptly changed), and hence a stable control may be realized. Further, when there is a need to avoid a state in which the internal temperature of the on-vehicle hydrogen tank 28 reaches the upper limit value Tth-Δt, it is desirable to perform a control of determining the value of the revolution R with respect to the temperature Td based on the dashed line B.

As described above, the controller 30 controls the flow rate of the hydrogen discharged from the low-pressure-side reciprocating compressor 4 (that is, the capacity of the low-pressure-side reciprocating compressor 4) by controlling the revolution of the driver 5 based on the detection pressure P1 detected by the pressure sensor 16. The predetermined threshold pressure PL and the predetermined threshold pressure PH are stored in advance in the storage unit of the controller 30. The threshold pressure PL is a lower-limit threshold pressure of a predetermined pressure range. Further, the threshold pressure PH is an upper-limit threshold pressure of a predetermined pressure range. The threshold pressure PH and the threshold pressure PL have a relation of the threshold pressure PH>the threshold pressure PL.

The predetermined pressure range is set based on the allowable range of the suction pressure in the high-pressure-side reciprocating compressor 14. Specifically, the temperature of the hydrogen discharged from the high-pressure-side reciprocating compressor 14 largely depends on the suction pressure of the high-pressure-side reciprocating compressor 14. For this reason, in order to control the temperature of the hydrogen supplied to the fuel cell vehicle 27, there is a need to control the suction pressure of the high-pressure-side reciprocating compressor 14 (the pressure of the intermediate passage 6) in an appropriate range. That is, when the suction pressure of the high-pressure-side reciprocating compressor 14 exceeds the allowable range of the high-pressure-side reciprocating compressor 14 (the suction pressure increases so as to be higher than the allowable range or decreases so as to be lower than the allowable range), the temperature of the discharged hydrogen decreases too much or increases too much, and hence it is difficult to control the temperature of the hydrogen even by the coolers 19 and 22 at the downstream side. Therefore, in this embodiment, the pressure range (the predetermined pressure range) within the allowable range of the suction pressure of the high-pressure-side reciprocating compressor 14 is set, the upper limit value of the pressure range is set as the upper-limit threshold pressure PH, and the lower limit value of the pressure range is set as the lower-limit threshold pressure PL. Further, when the discharge pressure of the low-pressure-side reciprocating compressor 4 increases too much, the discharge pressure exceeds the design pressures of the intermediate passage 6 and the intermediate pressure accumulator 9. Accordingly, the upper-limit threshold pressure PH may be determined in consideration of this point.

The controller 30 increases the revolution of the driver 5 by a predetermined value ΔR1 from the current value when the detection pressure P1 detected by the pressure sensor 16 becomes lower than the lower-limit threshold pressure PL (P1<PL). Then, the controller 30 increases the revolution of the driver 5 again by the predetermined value ΔR1 from the current value when the state of P1<PL is maintained after a predetermined time ΔT1. That is, the controller 30 increases the revolution of the driver 5 by the predetermined value ΔR1 from the current value every predetermined time ΔT1 as long as the state of P1<PL is maintained.

Further, the controller 30 decreases the revolution of the driver 5 by a predetermined value ΔR2 from the current value when the detection pressure P1 detected by the pressure sensor 16 becomes higher than the upper-limit threshold pressure PH (P1>PH). Then, the controller 30 decreases the revolution of the driver 5 again by the predetermined value ΔR2 from the current value when the state of P1>PH is maintained after a predetermined time ΔT2. That is, the controller 30 decreases the revolution of the driver 5 by the predetermined value ΔR2 from the current value every predetermined time ΔT2 as long as the state of P1>PH is maintained.

With such a configuration, the suction pressure (the intermediate pressure) of the high-pressure-side reciprocating compressor 14 is appropriately controlled within the predetermined pressure range from the threshold pressure PL to the threshold pressure PH or the vicinity thereof, so that the temperature of the on-vehicle hydrogen tank 28 is controllable.

Furthermore, when the pressure of the intermediate passage 6 (the pressure P1 inside the intermediate pressure accumulator 9) is continuously lower than the threshold pressure PL even by the continuous increase in the revolution of the driver 5 and hence the revolution of the driver 5 reaches a predetermined upper limit value Rmax, the controller 30 maintains the revolution of the driver 5 at the upper limit value Rmax. Also, the controller 30 outputs an alarm signal for displaying information, in which the revolution of the driver 5 reaches the upper limit value Rmax, on a display unit such as a liquid crystal panel (not shown) to the display unit.

Further, when the pressure of the intermediate passage 6 (the pressure P1 inside the intermediate pressure accumulator 9) is continuously higher than the threshold pressure PH even by the continuous decrease in the revolution of the driver 5 and hence the revolution of the driver 5 reaches a predetermined lower limit value Rmin, the controller 30 maintains the revolution of the driver 5 at the lower limit value Rmin and opens the bypass flow rate adjustment valve 32 so as to return the high-pressure hydrogen flowing through the intermediate passage 6 at the downstream side of the low-pressure-side reciprocating compressor 4 to the supply passage 3 through the bypass passage 33. Also, the controller 30 outputs an alarm signal for displaying information, in which the revolution of the driver 5 reaches the lower limit value Rmin, on a display unit such as a liquid crystal panel (not shown) to the display unit.

With this configuration, it is possible to escape a state where the pressure of the intermediate passage 6 (the pressure P1 inside the intermediate pressure accumulator 9) is higher than the upper limit (the upper-limit threshold pressure PH) of the predetermined pressure range, that is, a state of P1>PH at an early timing. Then, it is possible to avoid a state where the pressure of the intermediate passage 6 (the pressure P1 inside the intermediate pressure accumulator 9) abnormally increases.

Furthermore, the bypass flow rate adjustment valve 32 may be configured to arbitrarily adjust the opening degree thereof. In this case, when the state of P1>PH is maintained even when the bypass flow rate adjustment valve 32 is opened, the controller 30 gradually increases the opening degree of the bypass flow rate adjustment valve 32 as an elapse time from the state of P1>PH becomes longer or a difference ΔP (ΔP=P1−PH) between P1 and PH becomes larger. According to this configuration, it is possible to escape from the state of P1>PH within the shorter time without causing an abrupt change in pressure (compared to a case where the bypass flow rate adjustment valve 32 is opened with a small constant opening degree). Then, it is possible to further reliably prevent a state where the pressure of the intermediate passage 6 (the pressure P1 inside the intermediate pressure accumulator 9) abnormally increases.

With such a configuration, since the suction pressure (the intermediate pressure) of the high-pressure-side reciprocating compressor 14 is appropriately controlled in the hydrogen station 1 in which the reciprocating compressors 4 and 14 are provided as two stages (plural stages) (that is, two reciprocating compressors 4 and 14 are provided in series), it is possible to provide the hydrogen station 1 of which the temperature of the on-vehicle hydrogen tank 28 may be suppressed.

In the above-described hydrogen station, the compressors are provided as two stages, but in a hydrogen station in which hydrogen of which the pressure is increased to a pressure exceeding 100 MPa and is supplied and charged to a vehicle installed tank, the compressors may be provided as three stages or more. In this way, when the number of the compressors connected in series to one another (that is, the number of the stages of the compressors) increases, the pressure of the hydrogen may be set as a high pressure when the hydrogen is supplied to a target.

Figure 2:
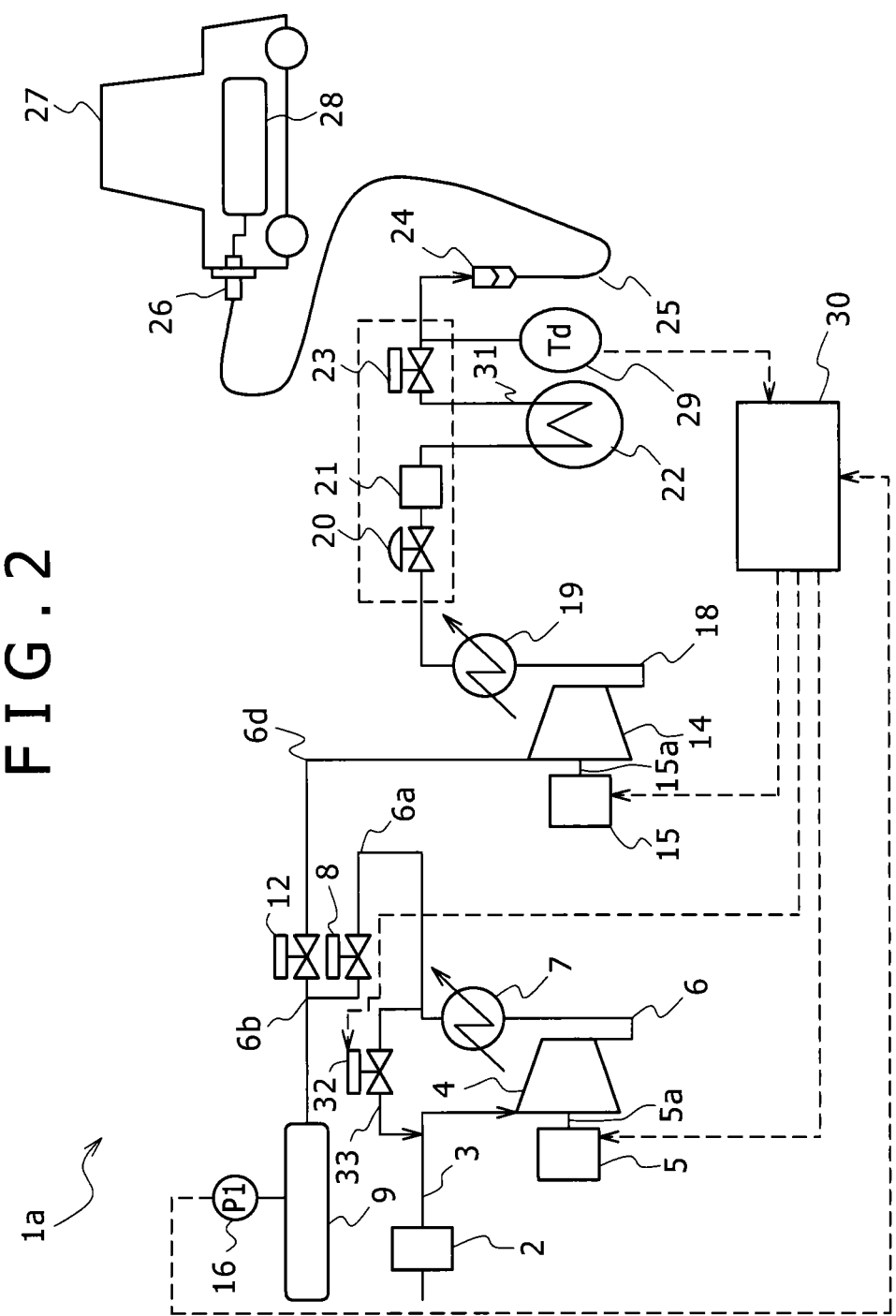
FIG. 2 is a diagram illustrating a modified example of the hydrogen station.

For example, when the compressors are provided as three stages (that is, three compressors are provided in series), the low-pressure-stage (first-stage) reciprocating compressor, the intermediate-pressure-stage (second-stage) reciprocating compressor, and the high-pressure-stage (the final-stage or third-stage) reciprocating compressor are connected in series to one another. Specifically, the low-pressure-stage compressor and the intermediate-pressure-stage compressor are connected to each other by the intermediate passage and the intermediate-pressure-stage compressor and the high-pressure-stage compressor are connected to each other by the intermediate passage. In the respective intermediate passages, as in such an embodiment that the compressors are provided as two stages as shown in FIGS. 1 and 2, the cooler, the opening and closing valve, the intermediate pressure accumulator, and the pressure sensor are respectively disposed from the upstream side. In this case, the respective compressors are controlled so that the pressure is sequentially increased by the three compressors and the discharge pressure of the final-stage compressor becomes a desired high pressure (for example, 150 MPa).

Further, in two intermediate pressure accumulators in which the intermediate passage is provided between the low-pressure-stage compressor and the intermediate-pressure-stage compressor and the intermediate passage is provided between the intermediate-pressure-stage compressor and the high-pressure-stage compressor, the intermediate pressure accumulators respectively store the hydrogen supplied from the low-pressure-stage compressor and the hydrogen supplied from the intermediate-pressure-stage compressor at predetermined pressures. Then, the controller controls the capacity of the final-stage compressor by controlling the revolution of the driver driving the intermediate-pressure-stage compressor and the revolution of the driver driving the low-pressure-stage compressor by the above-described method based on the detection pressures detected by the pressure sensors respectively disposed in the respective intermediate passages (or the respective intermediate pressure accumulators).

In the configuration in which the compressors are provided as three stages, a bypass passage may be provided so as to directly connect the discharge passage of the intermediate-pressure-stage compressor to the discharge passage of the high-pressure-stage compressor. Accordingly, the hydrogen discharged from the intermediate-pressure-stage compressor may be supplied to the fuel cell vehicle 27 without passing through the high-pressure-stage compressor. In this way, it is possible to selectively supply and charge the hydrogen (for example, 100 MPa) increased in pressure by the second-stage compressor and the hydrogen (for example, 150 MPa) further increased in pressure to a high pressure by the third-stage compressor in response to the hydrogen supply pressure demanded in accordance with the type or the like of the vehicle installed tank. Accordingly, the general versatility of the hydrogen station may be improved.

Furthermore, in a case where the compressors are provided as three stages, only the cooler may be provided in the intermediate passage between the low-pressure-stage compressor and the intermediate-pressure-stage compressor and the units such as the opening and closing valve, the intermediate pressure accumulator, and the pressure sensor may not be provided. Then, these units (the opening and closing valve, the intermediate pressure accumulator, and the pressure sensor) may be provided only in the intermediate passage between the intermediate-pressure-stage compressor and the high-pressure-stage compressor.

Second Embodiment

Figure 4:
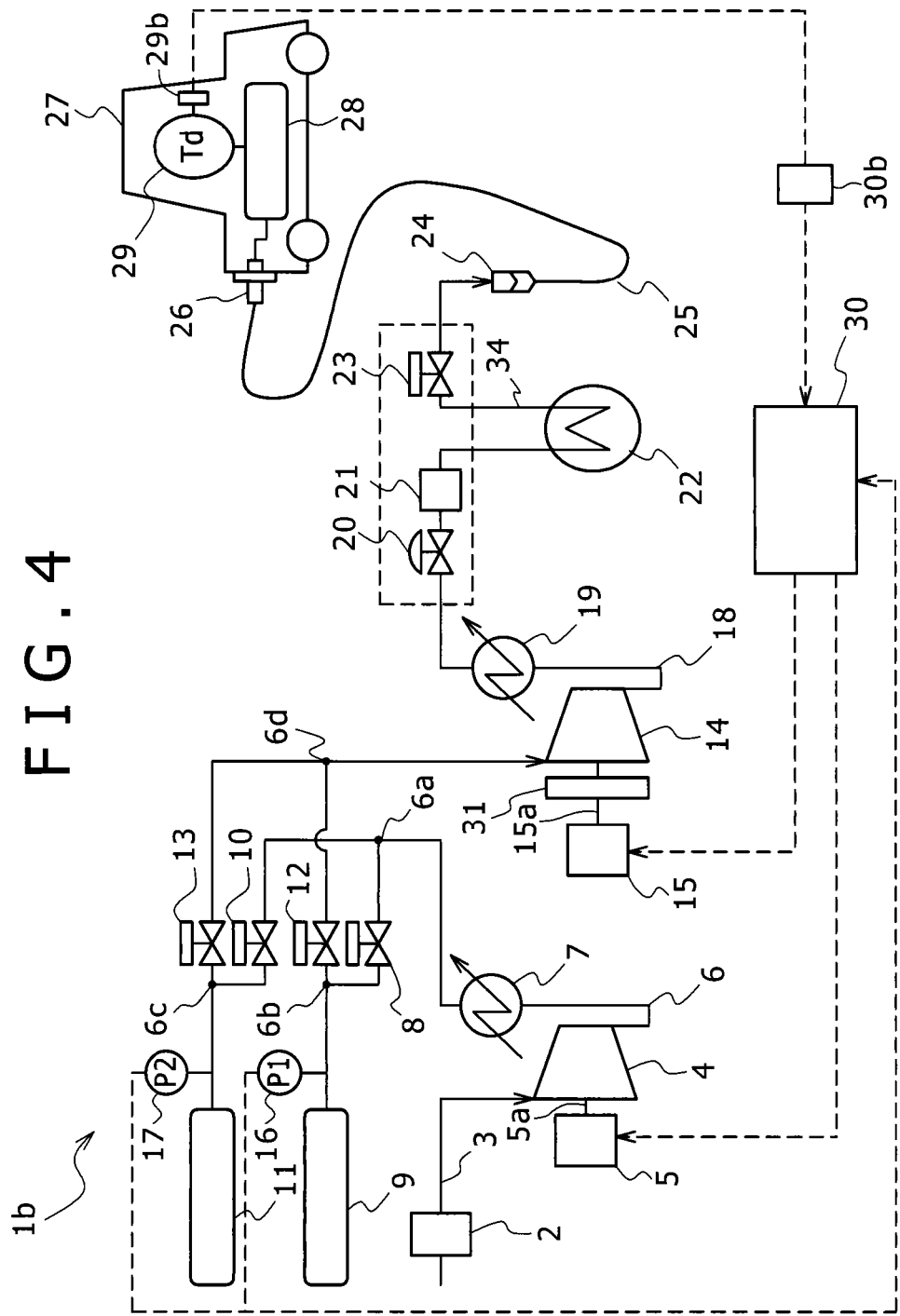
FIG. 4 is a diagram schematically illustrating a configuration of a hydrogen station according to a second embodiment of the present invention.

FIG. 4 illustrates a configuration of a hydrogen station 1b according to a second embodiment of the present invention. The hydrogen station 1b has substantially the same configurations as those of the hydrogen station 1 according to the first embodiment. Furthermore, the same reference signs will be given to the same configurations as those of the first embodiment and the specific description thereof will not be repeated.

The hydrogen station 1b of this embodiment is different from the hydrogen station 1 of the first embodiment in that two intermediate pressure accumulators (the first and second intermediate pressure accumulators 9 and 11) are provided and a flywheel 31 is provided in the drive shaft 15a connecting the high-pressure-side reciprocating compressor 14 to the driver 15. Further, the hydrogen station 1b of this embodiment is different from the hydrogen station 1 of the first embodiment in that the bypass passage 33 is not provided.

Specifically, the configuration is as below.

The hydrogen which is compressed by the low-pressure-side reciprocating compressor 4 is discharged to the intermediate passage 6. The intermediate passage 6 is equipped with the cooler 7 that cools the compressed hot hydrogen. Then, the intermediate passage 6 is branched into two passages at the branch point 6a. One intermediate passage 6 which is branched at the branch point 6a is connected to the first intermediate pressure accumulator 9 through the opening and closing valve 8 and the branch point 6b. Further, the other intermediate passage 6 which is branched at the branch point 6a is connected to the second intermediate pressure accumulator 11 through an opening and closing valve 10 and a branch point 6c.

Then, the intermediate passage 6 extends from the first intermediate pressure accumulator 9 to a junction point 6d through the branch point 6b and the opening and closing valve 12, and extends from the second intermediate pressure accumulator 11 to a junction point 6d through the branch point 6c and the opening and closing valve 13. The intermediate passage 6 extending from the first intermediate pressure accumulator 9 and the intermediate passage 6 extending from the second intermediate pressure accumulator 11 joined at the junction point 6d, and are connected to the high-pressure-side reciprocating compressor 14.

The first intermediate pressure accumulator 9 and the second intermediate pressure accumulator 11 first store the hydrogen supplied from the low-pressure-side reciprocating compressor 4.

Furthermore, the pressure sensor 16 is provided in the intermediate passage 6 between the branch point 6b and the first intermediate pressure accumulator 9. Further, a pressure sensor 17 is provided in the intermediate passage 6 between the branch point 6c and the second intermediate pressure accumulator 11.

The opening and closing valve 8 is opened when the detection pressure P1 detected by the pressure sensor 16 is lower than a predetermined first threshold value. Further, the opening and closing valve 8 is closed when the detection pressure P1 detected by the pressure sensor 16 is equal to or higher than the predetermined first threshold value. The opening and closing operation (particularly, the closing operation) of the opening and closing valve 8 prevents a state where the amount of the hydrogen supplied from the low-pressure-side reciprocating compressor 4 excessively increases so that the internal pressure of the first intermediate pressure accumulator 9 increases too much.

The opening and closing valve 10 is opened when the detection pressure P2 detected by the pressure sensor 17 is lower than a predetermined second threshold value. Further, the opening and closing valve 10 is closed when the detection pressure P2 detected by the pressure sensor 17 is equal to or higher than the predetermined second threshold value. The opening and closing operation (particularly, the closing operation) of the opening and closing valve 10 prevents a state where the amount of the hydrogen supplied from the low-pressure-side reciprocating compressor 4 excessively increases so that the internal pressure of the second intermediate pressure accumulator 11 increases too much.

Further, the opening and closing valve 12 is closed when the detection pressure P1 detected by the pressure sensor 16 is lower than a predetermined third the threshold value. Further, the opening and closing valve 12 is opened when the detection pressure P1 detected by the pressure sensor 16 is equal to or higher than the predetermined third the threshold value. The opening and closing operation of the opening and closing valve 12 prevents a state where the pressure of the hydrogen supplied to the high-pressure-side reciprocating compressor 14 excessively decreases.

The opening and closing valve 13 is closed when the detection pressure P2 detected by the pressure sensor 17 is lower than a predetermined fourth threshold value. Further, the opening and closing valve 13 is opened when the detection pressure P2 detected by the pressure sensor 17 is equal to or higher than the predetermined fourth threshold value. The opening and closing operation of the opening and closing valve 13 prevents a state where the pressure of the hydrogen supplied to the high-pressure-side reciprocating compressor 14 excessively decreases.

The revolution control is performed by adjusting the respective cycles of an intake, a compression, a combustion, and a discharge (a fuel intake amount or the like) in a case where the driver 15 connected to the high-pressure-side reciprocating compressor 14 through the drive shaft 15a is configured as, for example, an engine or the like. Here, there is a concern that the smooth rotation of the high-pressure-side reciprocating compressor 14 may be disturbed by a difference in revolution generated for each of the cycles. However, in the hydrogen station 1b, since the flywheel is provided in the drive shaft 15a connecting the high-pressure-side reciprocating compressor 14 to the driver 15, a difference in revolution for each cycle is reduced, and hence the smooth rotation of the high-pressure-side reciprocating compressor 14 may be performed.

Further, the torsional vibration is suppressed by adjusting the natural frequencies of the high-pressure-side reciprocating compressor 14 and the driver 15 using the flywheel 31 so that the natural frequencies are not included in the range of the control of the revolution of the driver 15. That is, the resonance of the driver revolutions of the high-pressure-side reciprocating compressor 14 and the driver 15 is suppressed in the range of the control of the revolution by the flywheel 31, so that the torsional vibration of the drive shaft 15a connecting the high-pressure-side reciprocating compressor 14 to the driver 15 is suppressed. For this reason, in the hydrogen station 1b equipped with the flywheel 31, the range of the control of the revolution of the driver 15 may be increased compared to the hydrogen station 1 without the flywheel, so that the range of the control of the capacity of the high-pressure-side reciprocating compressor 14 may be increased.

Furthermore, even in the hydrogen station 1 of the first embodiment, the flywheel 31 may be provided in the drive shaft 15a connecting the high-pressure-side reciprocating compressor 14 to the driver 15.

Third Embodiment

Figure 5:
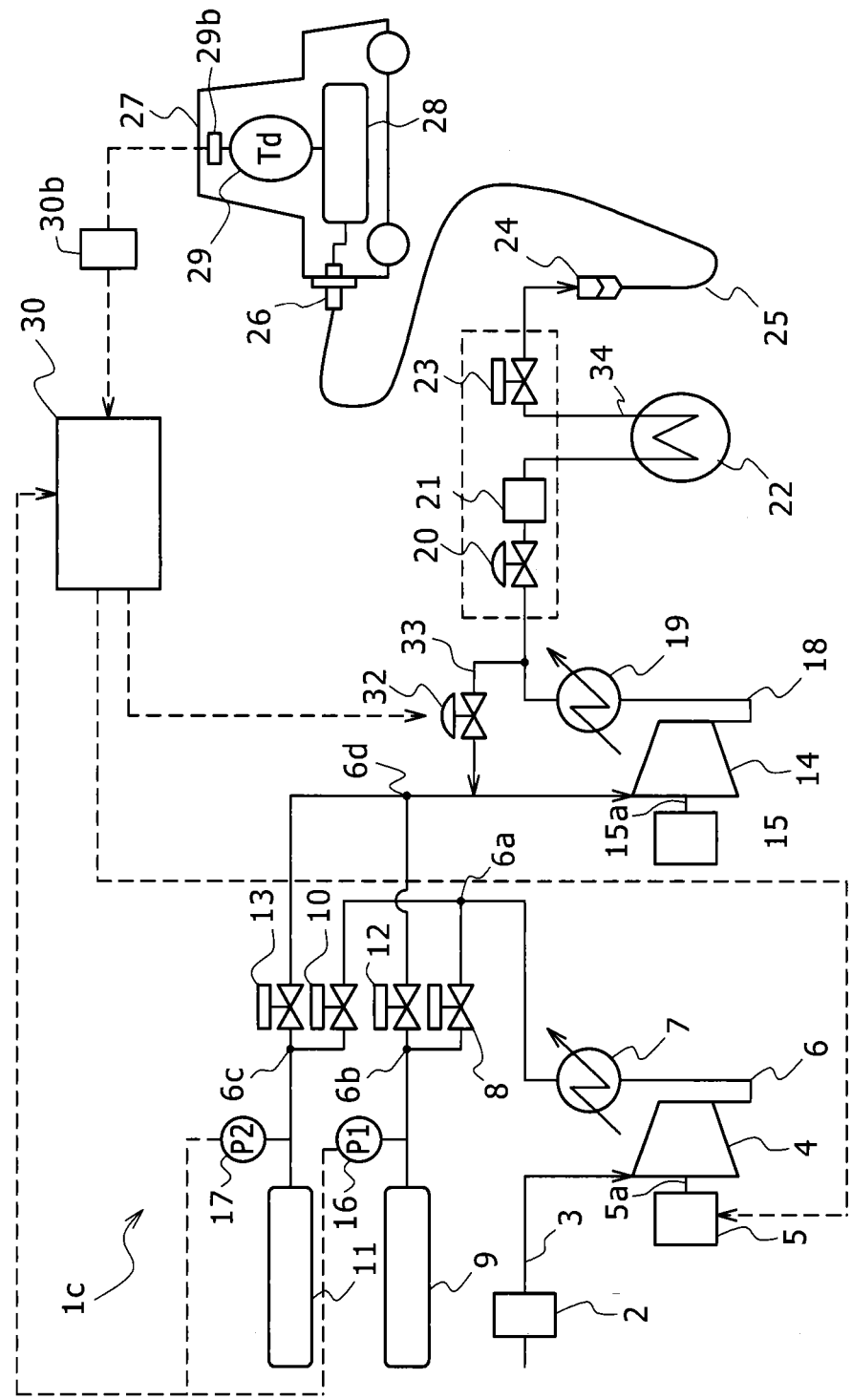
FIG. 5 is a diagram schematically illustrating a configuration of a hydrogen station according to a third embodiment of the present invention.

FIG. 5 illustrates a configuration of a hydrogen station 1c according to a third embodiment of the present invention. The hydrogen station 1c has substantially the same configurations as those of the hydrogen station 1b according to the second embodiment. Furthermore, the same reference signs will be given to the same configurations as those of the second embodiment and the specific description thereof will not be repeated.

In the hydrogen station 1b of the second embodiment, the revolution of the driver 15 is controlled based on the temperature Td, but the hydrogen station 1b of this embodiment has a difference in that the opening degree of the adjustment valve 32 is adjusted based on the temperature Td so as to adjust the amount (the return amount) of the hydrogen returned from the discharge side of the high-pressure-side reciprocating compressor 14 to the suction side thereof through a return passage 33 to be described later.

In the hydrogen station 1c, the return passage 33 is provided which connects the portion (the discharge side of the high-pressure-stage reciprocating compressor 14) at the downstream side of the cooler 19 in the discharge passage 18 to the portion (the suction side of the high-pressure-stage reciprocating compressor 14) at the downstream side of the junction point 6d in the intermediate passage 6 and the upstream side of the high-pressure-side reciprocating compressor 14. The return passage 33 is equipped with the adjustment valve 32. The opening degree of the adjustment valve 32 is adjusted by the controller 30 based on the temperature Td.

Figure 6:
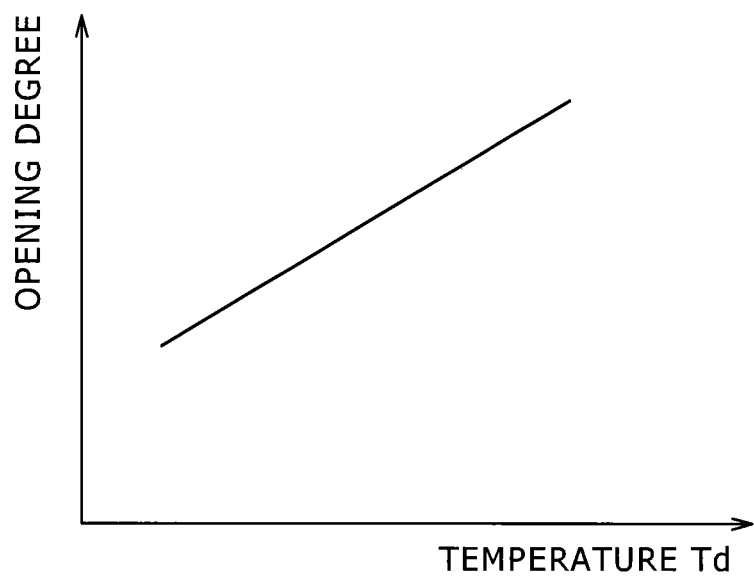
FIG. 6 is a diagram illustrating a relation between an internal temperature of an on-vehicle hydrogen tank and an opening degree of an adjustment valve provided in a return passage in the control of the hydrogen station according to the third embodiment.

The controller 30 stores, for example, a relational expression or correlation data of the internal temperature Td of the on-vehicle hydrogen tank 28 and the opening degree of the adjustment valve 32 in the storage unit. As shown in FIG. 6, regarding the relational expression or the correlation data, when the temperature Td becomes a small value, the corresponding opening degree of the adjustment valve 32 becomes a small value. On the contrary, when the temperature Td becomes a large value, the corresponding opening degree of the adjustment valve 32 becomes a large value.

Then, the controller 30 determines the opening degree of the adjustment valve 32 based on the function expression or the correlation data stored in the storage unit and the temperature Td detected by the temperature sensor 29, and adjusts the opening degree of the adjustment valve 32. Accordingly, the amount (the return amount) of the hydrogen returned from the discharge side of the high-pressure-side reciprocating compressor 14 to the suction side thereof through the return passage 33 is adjusted. That is, the controller 30 increases the opening degree of the adjustment valve 32 with an increase in the temperature Td and decreases the opening degree of the adjustment valve 32 with a decrease in the temperature Td.

Specifically, since the hydrogen supplied to the on-vehicle hydrogen tank 28 is sufficiently cooled when the temperature Td is low, the opening degree of the adjustment valve 32 is decreased, so that the return amount of the hydrogen to the suction side of the high-pressure-side reciprocating compressor 14 decreases. Accordingly, the high-pressure-side reciprocating compressor 14 is driven with a comparatively large capacity. Meanwhile, when the temperature Td is a large value, the hydrogen supplied to the on-vehicle hydrogen tank 28 is not sufficiently cooled. Thus, the opening degree of the adjustment valve 32 is increased, and hence the return amount of the hydrogen to the suction side of the high-pressure-side reciprocating compressor 14 increases. Accordingly, the high-pressure-side reciprocating compressor 14 is driven with a comparative small capacity. Further, a target temperature may be set and the capacity of the high-pressure-side reciprocating compressor 14 may be controlled so that the temperature Td becomes the target temperature.

Even in such a configuration, in the hydrogen station equipped with the reciprocating compressors 4 and 14, it is possible to provide the hydrogen station capable of easily controlling the temperature of the supplied hydrogen and suppressing an increase in the internal temperature of the on-vehicle hydrogen tank 28 when the hydrogen is charged to the hydrogen tank.

Furthermore, compared to the hydrogen stations 1, 1a, and 1b in which the entire amount of the hydrogen compressed by the respective reciprocating compressors 4 and 14 is supplied to the on-vehicle hydrogen tank 28, the hydrogen station 1c of this embodiment has a demerit that power loss is caused since a part of the compressed hydrogen is returned from the discharge side of the high-pressure-side reciprocating compressor 14 to the suction side thereof. However, in the hydrogen station 1c of this embodiment, since the control of the revolution the high-pressure-side reciprocating compressor 14 is not essentially needed, there is a merit that a motor rotating at a constant speed may be employed as the driver 15 without demanding the configuration (the inverter or the like) according to the revolution control.

Furthermore, the present invention is not limited to the above-described respective embodiments, and the shapes, the structures, the materials, the combination, and the like of the respective members may be appropriately modified without departing from the spirit of the present invention.

In the first and second embodiments, the reference temperature Tb as the target temperature is set in advance in order to control the amount (the return amount) of the hydrogen returned from the discharge side of the high-pressure-side reciprocating compressor 14 to the suction side thereof or the revolutions of the drivers 5 and 15 provided in the reciprocating compressors 4 and 14 based on the internal temperature Td of the on-vehicle hydrogen tank 28, but the control method using the reference temperature Tb is not limited. That is, in the above-described respective embodiments, the control method has been described in which the reference temperature Tb and the temperature Td are compared with each other and the opening degree of the adjustment valve 32 or the revolutions of the drivers 5 and 15 are adjusted so that the temperature Td becomes equal to or close to the reference temperature Tb, but the present invention is not limited to the control method using the reference temperature Tb.

For example, the reference temperature Tb may not be provided and only the upper-limit temperature Tth may be set. Specifically, in the upper-limit temperature Tth (or the temperature Tth-Δt2 lower than the upper-limit temperature Tth by the predetermined temperature Δt2) of FIG. 3, the revolution of the driver 15R is set as the minimum revolution (for example, zero) in specification. Alternatively, in the upper-limit temperature Tth (or the temperature Tth-Δt2) of FIG. 6, the opening degree of the adjustment valve 32 is set as the maximum opening degree in the specification of the adjustment valve 32. Then, the revolution of the driver 15R or the opening degree of the adjustment valve 32 is determined at the same time from the detected internal temperature Td of the on-vehicle hydrogen tank 28 and FIG. 3 or 6, and the revolution of the driver 15R or the opening degree of the adjustment valve 32 is changed. Even such a case is also included in the range of the present invention.

Further, in the hydrogen stations 1, 1a, and 1b of the first to third embodiments, the hydrogen supply target is the fuel cell vehicle 27, but the present invention is not limited thereto. The target may be a vehicle such as a hydrogen vehicle which runs using hydrogen.

Outline of Embodiments

The above-described embodiments may be summarized as below.

That is, according to the above-described embodiments, there is provided a hydrogen station that supplies hydrogen to an external hydrogen tank, the hydrogen station including: a reciprocating compressor that is driven by a driver of which revolution is controllable; a cooling device that is capable of cooling hydrogen supplied from the reciprocating compressor to the hydrogen tank; a temperature sensor that detects an internal temperature of the hydrogen tank or a temperature of the hydrogen supplied to the hydrogen tank; and a control unit that controls the revolution of the driver based on the temperature detected by the temperature sensor.

According to such a configuration, since the continuous capacity control may be performed by using the reciprocating compressor that is driven by the driver of which the revolution is controllable, the temperature of the supplied hydrogen may be easily controlled. That is, when the internal temperature of the hydrogen tank increases, the revolution of the driver is decreased so as to decrease the flow rate of the hydrogen passing through the cooling device, and hence the cooling ability of the cooling device is relatively improved. Accordingly, the temperature of the supplied hydrogen decreases, and hence the internal temperature of the hydrogen tank may be decreased or an increase in temperature may be suppressed. Meanwhile, when the internal temperature of the hydrogen tank falls (decreases), the revolution of the driver is increased so as to supply a large amount of hydrogen to the hydrogen tank within a short time. Further, since the temperature of the supplied hydrogen may be promptly controlled in response to a change in internal temperature of the hydrogen tank by the continuous capacity control, it is possible to suppress an increase in the internal temperature of the hydrogen tank when the hydrogen is charged to the hydrogen tank.

Further, in the above-described embodiments, the control unit may decrease the revolution of the driver when the temperature detected by the temperature sensor is higher than a reference temperature set based on an upper-limit temperature allowed in the hydrogen tank, and increase the revolution of the driver when the temperature detected by the temperature sensor is lower than the reference temperature.

According to such a configuration, the temperature of the supplied hydrogen may be appropriately controlled just by the comparison control of the temperature detected by the temperature sensor and the revolution of the driver driving the reciprocating compressor.

In the control of the revolution the driver based on the detected temperature, the control unit may control the revolution of the driver so that a decrease ratio of the revolution of the driver or an increase ratio of the revolution of the driver becomes constant.

According to such a configuration, since the revolution of the driver changes (decreases or increases) at a constant ratio in response to a change (an increase or a decrease) in the detected temperature, an abrupt change in revolution with a change in detected temperature may be prevented, and hence stable control may be performed.

Further, in the control of the revolution the driver based on the detected temperature, when the temperature detected by the temperature sensor is higher than the reference temperature, the control unit may increase a decrease ratio of the revolution of the driver as a difference in temperature between the detected temperature and the reference temperature increases.

According to such a configuration, since the revolution decrease ratio increases as the detected temperature increases, the cooling efficiency of the cooling device is further improved. For this reason, it is possible to further reliably suppress the hot internal temperature of the hydrogen tank.

Further, the hydrogen station may further include a flywheel that is attached to a drive shaft connecting the reciprocating compressor to the driver.

In this way, since the flywheel is provided in the drive shaft, the reciprocating compressor smoothly rotates. Further, the resonance between the driver revolution and the natural frequencies of the reciprocating compressor and the driver is suppressed by the flywheel. Accordingly, the torsional vibration of the drive shaft connecting the reciprocating compressor to the driver is suppressed. Accordingly, it is possible to increase the range of the control of the revolution of the driver 15 compared to the hydrogen station without the flywheel. As a result, it is possible to increase the range of the control of the capacity of the reciprocating compressor.

Further, according to the above-described embodiments, there is provided a hydrogen station that supplies hydrogen to an external hydrogen tank, the hydrogen station including: a reciprocating compressor that is driven by a driver; a cooling device that is capable of cooling the hydrogen supplied from the reciprocating compressor to the hydrogen tank; a return passage that includes an adjustment valve and causes a discharge side of the reciprocating compressor at an upstream side of the cooling device to communicate with a suction side of the reciprocating compressor; a temperature sensor that detects an internal temperature of the hydrogen tank or a temperature of the hydrogen supplied to the hydrogen tank; and a control unit that adjusts an opening degree of the adjustment valve based on the temperature detected by the temperature sensor.

According to such a configuration, since the continuous capacity control of the reciprocating compressor may be performed by adjusting the flow rate of the hydrogen in a manner such that the hydrogen is returned from the discharge side of the reciprocating compressor to the suction side thereof through the adjustment valve of which the opening degree is adjustable, the temperature of the supplied hydrogen may be easily controlled. That is, when the internal temperature of the hydrogen tank increases, the opening degree of the adjustment valve is increased so as to increase the flow rate of the hydrogen returned to the suction side, and hence the flow rate of the hydrogen passing through the cooling device decreases. Thus, since the cooling ability of the cooling device is relatively improved, the temperature of the supplied hydrogen is decreased so that the internal temperature of the hydrogen tank may be decreased or an increase in temperature may be suppressed. Meanwhile, when the internal temperature of the hydrogen tank falls (decreases), the opening degree of the adjustment valve is decreased so as to decrease the flow rate of the hydrogen returned to the suction side, and hence the flow rate of the hydrogen passing through the cooling device increases. Thus, a large amount of hydrogen may be supplied to the hydrogen tank within a short time.

Further, since the temperature of the supplied hydrogen may be promptly controlled in response to a change in internal temperature of the hydrogen tank by the continuous capacity control, it is possible to suppress an increase in the internal temperature of the hydrogen tank when the hydrogen is charged to the hydrogen tank.

In the control of the opening degree of the adjustment valve based on the detected temperature, the control unit may increase an opening degree of the adjustment valve when the temperature detected by the temperature sensor is higher than a reference temperature set based on an upper-limit temperature allowed in the hydrogen tank, and decrease the opening degree of the adjustment valve when the temperature detected by the temperature sensor is lower than the reference temperature.

According to such a configuration, it is possible to appropriately control the temperature of the supplied hydrogen just by the comparison control of the temperature detected by the temperature sensor and the opening degree of the adjustment valve.

Further, according to the above-described embodiments, there is provided a hydrogen station that supplies hydrogen to an external hydrogen tank, the hydrogen station including: a first reciprocating compressor that is driven by a driver of which revolution is controllable; an intermediate passage through which the hydrogen compressed by the first reciprocating compressor flows; a second reciprocating compressor that is connected to the first reciprocating compressor through the intermediate passage; a cooling device that is capable of cooling the hydrogen supplied from the second reciprocating compressor to the hydrogen tank; a pressure sensor that detects an internal pressure of the intermediate passage; and a control unit that controls the revolution of the driver driving the first reciprocating compressor based on the pressure detected by the pressure sensor.

According to such a configuration, since the continuous capacity control may be performed by using the first reciprocating compressor and the second reciprocating compressor of which the revolutions are controllable, the temperature of the supplied hydrogen may be easily controlled.

Further, since the suction pressure of the rear-stage (high-pressure-side) reciprocating compressor (second reciprocating compressor) is appropriately controlled, the temperature of the supplied hydrogen may be reliably controlled in the hydrogen station in which the reciprocating compressors are provided as two stages. Specifically, the configuration is as below.

The temperature of the hydrogen supplied to the supply target largely depends on the suction pressure of the rear-stage (high-pressure-side) reciprocating compressor. For this reason, in order to control the temperature of the hydrogen supplied to the supply target, there is a need to control the suction pressure of the rear-stage (high-pressure-side) reciprocating compressor within an appropriate range. That is, when the suction pressure (the internal pressure of the intermediate passage) of the rear-stage (high-pressure-side) reciprocating compressor exceeds the allowable range of the reciprocating compressor (becomes excessively higher than the allowable range or lower than the allowable range), the temperature of the discharged hydrogen increases or decreases too much. For this reason, it is difficult to control the temperature of the hydrogen at the downstream side. Therefore, since the revolution of the front-stage (low-pressure-side) reciprocating compressor and the suction pressure of the rear-stage (high-pressure-side) reciprocating compressor are controlled by detecting the internal pressure of the intermediate passage (the suction pressure of the rear-stage reciprocating compressor), the temperature of the supplied hydrogen may be reliably controlled even in the hydrogen station in which the reciprocating compressors are provided as two stages.

Further, in the hydrogen station in which the reciprocating compressors are provided as two stages, the hydrogen station may include an intermediate pressure accumulator that is provided in the course of the intermediate passage and is capable of storing the hydrogen flowing through the intermediate passage, and the pressure sensor may detect the internal pressure of the intermediate pressure accumulator as the internal pressure of the intermediate passage.

According to such a configuration, since the capacity of the front-stage (low-pressure-side) reciprocating compressor may be decreased and the hydrogen is stored in the intermediate pressure accumulator of the intermediate passage, the pressure of the hydrogen (the suction pressure of the rear-stage reciprocating compressor) supplied to the rear-stage (high-pressure-side) reciprocating compressor is further stabilized.

In the control of the rotation of the front-stage driver based on the detected pressure of the intermediate passage, the control unit may increase the revolution of the driver when the pressure detected by the pressure sensor becomes lower than the lower-limit threshold pressure in the pressure range set based on the allowable range of the suction pressure in the second reciprocating compressor, and may decrease the revolution of the driver when the pressure detected by the pressure sensor becomes higher than the upper-limit threshold pressure in the pressure range.

According to such a configuration, it is possible to appropriately control the pressure of the hydrogen supplied to the rear-stage reciprocating compressor (the suction pressure of the rear-stage reciprocating compressor) just by the comparison control of the internal pressure of the intermediate passage detected by the pressure sensor and the revolution of the driver driving the front-stage reciprocating compressor.

Further, in the hydrogen station in which the reciprocating compressors are provided as two stages, the hydrogen station may further include a bypass passage which includes an adjustment valve and causes a suction side of the first reciprocating compressor to communicate with an upstream portion relative to the intermediate pressure accumulator in the intermediate passage. Then, when the pressure detected by the pressure sensor is continuously higher than the upper-limit threshold pressure and the revolution of the driver reaches a predetermined lower limit value, the control unit may open the adjustment valve while maintaining the revolution at the lower limit value.

According to such a configuration, when the increased internal pressure of the intermediate passage (the increased suction pressure of the rear-stage reciprocating compressor) does not decrease even by the control of the revolution the driver, a part of the hydrogen that flows through the intermediate passage from the front-stage reciprocating compressor to the rear-stage reciprocating compressor may be made to flow to the suction side of the front-stage reciprocating compressor. Accordingly, the internal pressure of the intermediate passage may be reliably decreased.

In a case where the bypass passage with the adjustment valve is provided, the adjustment valve may adjust the opening degree thereof. Then, when the pressure detected by the pressure sensor is continuously higher than the upper-limit threshold pressure even when the adjustment valve is opened so that the opening degree becomes a predetermined opening degree, the control unit may increase the opening degree of the adjustment valve as an elapse time from the opening of the adjustment valve becomes longer or a difference between the pressure detected by the pressure sensor and the upper-limit threshold pressure becomes higher.

In this way, the internal pressure of the intermediate passage may be further reliably decreased by increasing the opening degree of the adjustment valve as the elapse time from the opening of the adjustment valve becomes longer or a difference between the internal pressure of the intermediate passage and the upper-limit threshold value becomes larger.

INDUSTRIAL APPLICABILITY

As described above, the hydrogen station according to the present invention is a hydrogen station which is suitable for supplying hydrogen to a fuel cell vehicle, a hydrogen vehicle, and the like and includes a reciprocating compressor. Further, the hydrogen station may easily control the temperature of the hydrogen supplied thereto and appropriately suppress an abrupt increase in temperature of the hydrogen when the hydrogen is charged to a hydrogen tank.

The invention claimed is:

1. A hydrogen station for supplying hydrogen to an external hydrogen tank, the hydrogen station comprising:
   a reciprocating compressor driven by a driver;
   a cooling device for cooling the hydrogen supplied from the reciprocating compressor to the external hydrogen tank;
   a return passage comprising an adjustment valve and causing a discharge side of the reciprocating compressor at an upstream side of the cooling device to communicate with a suction side of the reciprocating compressor;

a temperature sensor for detecting an internal temperature of the external hydrogen tank or a temperature of the hydrogen supplied to the external hydrogen tank; and a control unit for adjusting an opening degree of the adjustment valve based on the temperature.

2. The hydrogen station according to claim 1, wherein the control unit increases an opening degree of the adjustment valve when the temperature is higher than a reference temperature set based on an upper-limit temperature allowed in the external hydrogen tank, and the control unit decreases the opening degree of the adjustment valve when the temperature is lower than the reference temperature.

3. A hydrogen station for supplying hydrogen to an external hydrogen tank, the hydrogen station comprising:

a first reciprocating compressor driven by a driver of which revolution is controllable;

an intermediate passage through which hydrogen compressed by the first reciprocating compressor flows;

a second reciprocating compressor connected to the first reciprocating compressor through the intermediate passage;

a cooling device for cooling the hydrogen supplied from the second reciprocating compressor to the external hydrogen tank;

a pressure sensor for detecting an internal pressure of the intermediate passage; and a control unit for controlling the revolution of the driver driving the first reciprocating compressor based on the internal pressure.

4. The hydrogen station according to claim 3, further comprising:

an intermediate pressure accumulator provided in a course of the intermediate passage and for storing the hydrogen flowing through the intermediate passage, wherein the pressure sensor detects an internal pressure of the intermediate pressure accumulator as an internal pressure of the intermediate passage.

5. The hydrogen station according to claim 3, wherein the control unit increases the revolution of the driver when the internal pressure is lower than a lower-limit threshold pressure in a pressure range set based on an allowable range of a suction pressure in the second reciprocating compressor, and the control unit decreases the revolution of the driver when the internal pressure is higher than an upper-limit threshold pressure in the pressure range.

6. The hydrogen station according to claim 5, further comprising:

a bypass passage comprising an adjustment valve and causing a suction side of the first reciprocating compressor to communicate with an upstream portion relative to an intermediate pressure accumulator in the intermediate passage, wherein when the internal pressure is continuously higher than the upper-limit threshold pressure and the revolution of the driver reaches a predetermined lower limit value, the control unit opens the adjustment valve while maintaining the revolution at the predetermined lower limit value.

7. The hydrogen station according to claim 6, wherein the adjustment valve is able to adjust an opening degree thereof, and wherein when the internal pressure is continuously higher than the upper-limit threshold pressure even when the adjustment valve is opened so that the opening degree thereof becomes a predetermined opening degree, the control unit increases the opening degree of the adjustment valve as an elapse time from the opening of the adjustment valve becomes longer or a difference between the internal pressure and the upper-limit threshold pressure becomes larger.

* * * * *